(12) United States Patent
Schröder

(10) Patent No.: US 10,666,115 B2
(45) Date of Patent: May 26, 2020

(54) ELECTRIC MACHINE

(71) Applicant: AUDI AG, Ingolstadt (DE)

(72) Inventor: Maximilian Schröder, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/815,300

(22) Filed: Nov. 16, 2017

(65) Prior Publication Data

US 2018/0145564 A1     May 24, 2018

(30) Foreign Application Priority Data

Nov. 21, 2016 (DE) .................. 10 2016 222 847

(51) Int. Cl.
| | |
|---|---|
| *H02K 9/20* | (2006.01) |
| *H02K 5/02* | (2006.01) |
| *H02K 9/197* | (2006.01) |
| *H02K 1/32* | (2006.01) |

(52) U.S. Cl.
CPC .................. *H02K 9/20* (2013.01); *H02K 1/32* (2013.01); *H02K 5/02* (2013.01); *H02K 9/197* (2013.01)

(58) Field of Classification Search
CPC ............ H02K 1/32; H02K 5/02; H02K 9/197; H02K 9/20
USPC ........................................................ 310/52
See application file for complete search history.

(56) References Cited

U.S. PATENT DOCUMENTS

| | | |
|---|---|---|
| 3,715,610 A | 2/1973 | Brinkman |
| 3,801,843 A | 4/1974 | Corman et al. |
| 6,772,504 B2 | 8/2004 | Weidman et al. |
| 7,102,267 B2 | 9/2006 | Gromoll et al. |
| 7,443,062 B2 | 10/2008 | Dong et al. |
| 9,154,018 B2 | 10/2015 | Agostini et al. |
| 2006/0066156 A1* | 3/2006 | Dong ................. H02K 9/20 310/54 |
| 2012/0169158 A1* | 7/2012 | Buttner ............... H02K 9/20 310/54 |
| 2018/0041105 A1* | 2/2018 | Bauer ................. H02K 55/04 |

FOREIGN PATENT DOCUMENTS

| | | |
|---|---|---|
| CN | 102598485 A | 7/2012 |
| CN | 105531911 A | 4/2016 |
| DE | 2052839 A1 | 4/1972 |
| DE | 4021861 A1 | 1/1992 |
| DE | 10258778 A1 | 7/2004 |
| EP | 2 299 565 A1 | 3/2011 |
| EP | 2933902 B1 | 6/2016 |
| JP | 2004-159402 A | 6/2004 |
| JP | 2010-220402 A | 9/2010 |
| WO | 2006/134057 A1 | 12/2006 |

(Continued)

OTHER PUBLICATIONS

European Search Report dated Apr. 25, 2018, in connection with corresponding EP Application No. 17197201.1 (6 pgs.).

(Continued)

*Primary Examiner* — Alex W Mok

(74) *Attorney, Agent, or Firm* — Maier & Maier, PLLC

(57) ABSTRACT

An electric machine provided with a stator and with a rotor arranged on a coolable shaft which is rotatably mounted with respect to the stator. The rotor is connected to the shaft by a thermosiphon device which is non-rotatably connected to the rotor and arranged on the front side of the rotor.

7 Claims, 1 Drawing Sheet

(56) References Cited

FOREIGN PATENT DOCUMENTS

| WO | 2013131825 A2 | 9/2013 |
| WO | 2015197474 A1 | 12/2015 |
| WO | 2016/119968 A1 | 8/2016 |

OTHER PUBLICATIONS

German Search Report dated Oct. 13, 2017 of corresponding German application No. 102016222847.1; 5 pgs.
Office Action dated May 5, 2019, in corresponding Chinese Application No. 201711159102.8; 16 pages.
Office Action dated Mar. 2, 2020 in corresponding Chinese Application No. 201711159102.8; 7 pages including English-language translation.

\* cited by examiner

ELECTRIC MACHINE

FIELD

The invention relates to an electric machine with a stator and a rotor which is mounted rotatably with respect to the stator and arranged on a coolable shaft.

BACKGROUND

The electric machine is provided with a stator, which is preferably arranged in a stationary manner in a machine housing of the electric machine. On the other hand, the rotor is rotatably mounted with respect to the stator and thus also with respect to the machine housing. For example, the rotor is rotatably mounted on and/or in the machine housing, in particular by means of a bearing, preferably a roller bearing. The rotor is in this case arranged on a coolable shaft. This is to be understood so that the rotor and the shaft are formed separately from each other and joined together subsequently. However, it can be also provided that the shaft is formed integrally with the rotor.

The shaft and therefore also the rotor are arranged in the longitudinal section with respect to an axis of rotation of the shaft, preferably at least in some regions within the stator. For example, the shaft completely engages the stator in the axial direction with respect to the axis of rotation, which is to say that it projects axially beyond the latter, seen in the axial direction.

The shaft is coolable. This means at least that the shaft consists of a heat-conducting material so that the heat supplied to the shaft is dissipated by means of the heat conduction. However, the shaft can be also coolable actively, for which purpose a corresponding cooling device is associated with it. Such a cooling device can be for example a hollow shaft and/or lance cooling.

In the first case, at least one coolant channel is formed in the shaft, through which a coolant can flow. The shaft can be designed for example as a hollow shaft.

Additionally or as an alternative, lance cooling can be provided. Also in this case, the shaft is provided as a hollow shaft, at least in some sections. In this case, a cooling lance is engaged in the shaft, for example by means of an opening formed in the shaft on the front face side. A coolant is introduced by means of the cooling lance into the shaft, in particular injected into it. In both cases, the coolant absorbs the heat supplied to the shaft and conducts it away from the shaft.

The electric machine can be designed for example as an asynchronous machine or as a synchronous machine that is excited by current. The continuous power concentration, which is to say the continuous power that the electric machine can provide at a specified weight and/or volume, is primarily limited thermally. In the case of electric machines having rotor-critical characteristics, the heat dissipation from the rotor is in particular of decisive importance for the permanent line density to be achieved. For example, the heat generated in or at the rotor is dissipated by the shaft in the described manner, in particular via the coolable or actively cooled shaft. Additionally or as an alternative, recirculated air cooling is also possible.

SUMMARY

The object of the invention is to propose an electric machine which has advantages over known electric machines, in particular because it can be cooled more efficiently.

In this case it is provided that the rotor is connected to the shaft in a heat-transmitting manner by means of a thermosiphon device which is non-rotatably connected to the rotor and arranged on the front face side on the rotor.

The cooling of the electric machine is influenced to a decisive extent by the amount of the heat which can be transferred from the rotor to the (coolable) shaft and which can be therefore drawn off from the rotor to the shaft. However, the radial thermal conductivity of the rotor is limited. The thermosiphon device is non-rotatably connected to the rotor and/or to the shaft and arranged on the front side at the rotor. This means that with respect to the axis of rotation of the shaft in the longitudinal section, the thermosiphon device is located next to the rotor, in particular directly next to the rotor. It is preferred when the thermosiphon device is directly adjacent to the rotor, which is to say that it is not arranged at a distance from it. In principle it may be sufficient when only one such a thermosiphon device is provided at one front side of the rotor. However, it is preferred when multiple thermosiphon devices are associated with the electric machine, which are in particular arranged on the opposite sides of the rotor. The thermosiphon devices are preferably designed to have the same construction, but it goes without saying that they can also have a mirror-image construction with respect to the rotor.

In the thermosiphon device is arranged the coolant, which is circulated within the thermosiphon device due to the different temperatures of the rotor and of the shaft.

In particular, the coolant is selected in such a way that it evaporates and condenses at an operating temperature of the shaft which has a lower temperature than the rotor. Due to the non-rotating connection of the thermosiphon device to the rotor, the device is designed as a rotary thermosiphon device. The principle of this function is based on the fact that the coolant condensing on the shaft is thrown outwards due to its considerably greater density compared to the evaporated coolant, which means that the condensed coolant is picked up by the shaft as a result of the influence of centrifugal force. It is preferred when a coolant is used which has dielectric properties in all aggregate states that may occur, which is to say that it is electrically non-conducting. This is in particular the case with liquid and gaseous aggregate states.

The coolant that has been thrown in the outward direction then reaches the regions of the rotor that are located further outwards in the radial direction, which have a higher temperature than the shaft and/or further regions of the rotor located further inside in the radial direction. Due to the higher temperature, the coolant evaporates and it is pushed again in the outward direction along with the coolant that was thrown in the direction of the shaft so that it condenses on the shaft. This results in the circulation of the coolant by means of which a relatively large heat amount per unit of time is transmitted from the rotor to the shaft and then discharged by it.

According to another embodiment of the invention it is provided that thermosiphon device is arranged on a short circuit ring on a side of the rotor sheet metal packet facing away from the rotor, or it is integrated with a short circuit ring. The rotor consists for example of a rotor sheet metal packet, a cage winding, as well as a short-circuit ring, wherein the cage winding can be more generally referred to as a motor winding. The rotor sheet metal packet consists of a plurality of rotor plates that are arranged in parallel in the axial direction and directly adjacent to one another.

The cage winding is arranged on the rotor sheet metal packet. In the axial direction, the cage winding is terminated in the axial direction by the short-circuit ring. In particular, such a short-circuit ring is present in each case on the axially opposite side of the rotor. The short-circuit ring can completely overlap the rotor sheet metal packet and the cage winding, so that is adjacent to the shaft in the radial direction. However, it can be also arranged at a distance from the shaft in the radial direction, namely so that the rotor sheet metal packet and/or the cage winding overlap only partially in the radial direction.

The thermosiphon device adjoins the short-circuit ring as seen in the axial direction. In particular, it is arranged adjacent to it, so that the heat from the rotor is dissipated via the short-circuit ring to the thermosiphon device. As an alternative, the thermosiphon device can be of course also designed so that it is integrated with the short circuit ring. It is preferred when each short-circuit ring of the rotor is associated with such a thermosiphon device or designed so that it is integrated with it, and so that at least one such a thermosiphon device is present in the axial direction on the opposite sides of the rotor. This has been already mentioned above.

Within the scope of another embodiment of the invention, it can be provided that a fluid chamber of the thermosiphon device is delimited at least in some areas by the short-circuit ring, or by a wall of the thermosiphon device adjoining the short-circuiting ring.

The fluid chamber of the thermosiphon device serves to receive the coolant. In order to achieve a particular good heat transfer from the rotor to the coolant, the fluid chamber can be in some sections delimited by the short-circuit ring, which is to say so that it is directly adjoining it. It is preferred when a side of the fluid chamber facing the rotor is completely delimited by the short circuit ring.

As an alternative, the thermosiphon device can of course also have a wall provided in the direction of the rotor which delimits the fluid chamber in this direction. This wall is located on the side facing away from its fluid chamber, preferably adjacent to the short-circuit ring.

According to a further development of the invention it is provided that surface increasing elements projecting into the fluid chamber are arranged so as to project from the short-circuit ring and/or the wall. The surface increasing elements serve to intensify the heat transfer between the short-circuit ring or the wall and the cooling. The surface increasing elements can be in principle designed with any configuration. For example, they can be provided in the form of fins, wings, wingless, etc. The surface increasing elements are arranged on or attached to the short-circuit ring of the wall, or they project into the fluid chamber.

According to another embodiment it is provided that the fluid chamber is delimited at least in sections by an outer circumference of the shaft. In this manner, the heat transfer from the fluid to the shaft can be carried out particularly well because the fluid comes into direct contact with the shaft or with its out circumference.

According to another preferred embodiment of the invention, it is provided that the thermosiphon device extends radially inward from the shaft with respect to an axis of rotation of the shaft and overlaps the rotor at least partially, in particular completely, in the radial direction outwards. The thermosiphon device in this respect extends radially from the shaft, outwardly along the rotor. In this case, it overlaps it in radial direction at least partially, preferably completely. In particular, the thermosiphon device is ended flush with the rotor in the radial direction, for example by the rotor metal sheet packet and/or by the cage winding.

Within the context of another embodiment of the invention it is provided that at least one heat transport element protrudes from the short-circuit ring into the fluid chamber, in particular into a heat transport element that is equipped with surface increasing elements. The heat transport element passes through the rotor at least in some sections and projects into the fluid chamber. The heat transport element thus serves to this extent to intensify the heat transport through the rotor in the axial direction, so that the rotor can transmit the heat better to the coolant. The heat transport element can be provided analogously to the short-circuit ring or walls with surface increasing elements. These elements can be also designed accordingly. It is preferred when only the part that is projecting into the fluid chamber of the heat transport element is equipped with such surface increasing elements.

According to another embodiment of the invention it is provided that the heat transport element passes through the rotor at least partially, in particular completely, in the direction facing away from the thermosiphon device. In order to enable a heat transport through the rotor in the most intensive manner in the axial direction, the heat transport element passes through it at least partially or even fully. The partial penetration is preferred to be understood as penetration in axial direction to at least 10%, at least 20%, at least 25%, at least 30%, at least 70%, at least 75%, at least 80%, or at least 90%. Full penetration comprises to a penetration in axial direction by 100%.

According to a further development it is provided that the heat transport element is located adjacent to the rotor sheet metal packet and/or to the cage winding of the rotor. In particular, the heat transport element passes through the rotor sheet metal packet and/or the cage winding in the axial direction in the manner described above. In this case, the rotor sheet metal packet and/or the cage winding in the heat transmission winding are in a heat-transmitting connection with the heat transport element and they are arranged on it, preferably on a flat surface. In addition, it can be provided that in order to improve the heat transfer between the rotor sheet metal packet and/or the cage winding on the one hand and the heat transport element on the other hand, a heat conducting means is introduced between them. The heat conducting element is preferably a fluid and/or a pasty heat conducting element.

Finally, it may be provided in the context of another embodiment of the invention that the heat transport is provided in the form of a heat tube, in particular a heat pipe. With such a configuration, a particularly intensive heat transfer can be achieved, from the rotor to the cooling means located in the fluid chamber and thus also to the shaft of the electric machine.

BRIEF DESCRIPTION OF THE FIGURES

The invention will be explained next in more detail below with reference to the embodiments illustrated in the figures, without limiting the invention. The figures show the following.

DETAILED DESCRIPTION OF THE FIGURES

Figure 1:
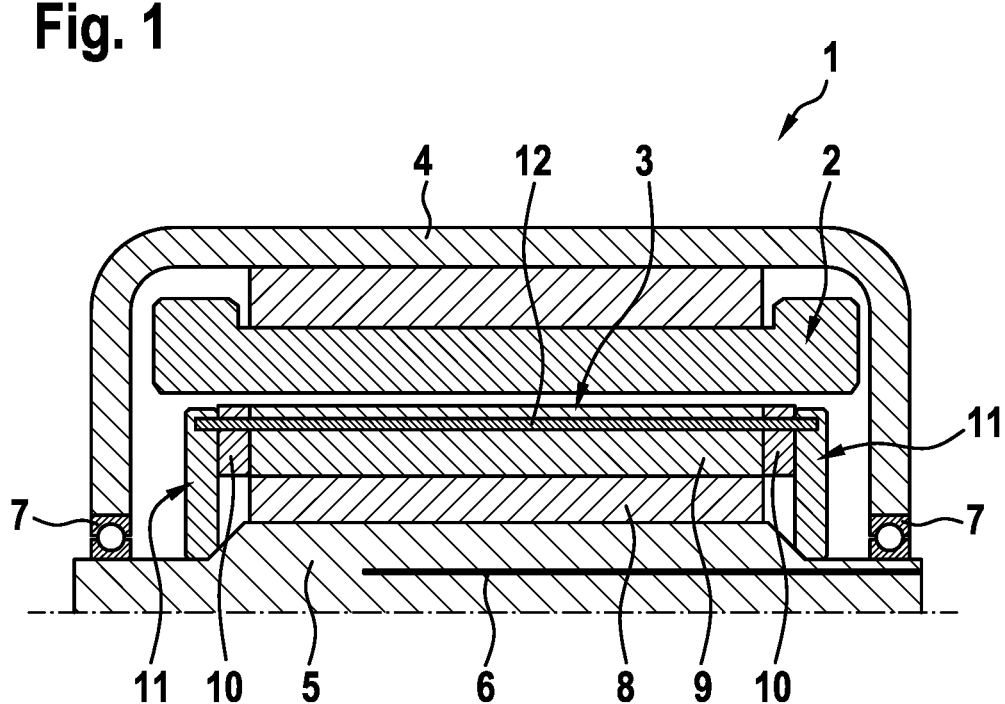
FIG. 1 shows a schematic longitudinal sectional view of an electric machine provided with a stator and a rotor, which is rotatably mounted with respect to the stator and arranged on a coolable shaft, wherein a thermosiphon device is arranged on both sides of the rotor.

FIG. 1 shows a longitudinal sectional view through an electric machine 1, provided with a stator 2 and a rotor 3, which are arranged in a machine housing 4 of the electric machine 1. The rotor 3 is arranged on a rotatably mounted shaft 5, which can be preferably actively cooled, in particular by means of a cooling means lance 6 which is extending in the axial direction into the shaft 5. The shaft 5 is rotatably mounted by means of at least one bearing 7, (here by means of two bearings 7), on the machine housing 4. The bearing 7 is preferably designed as a roller bearing. The rotor 3 comprises a rotor sheet metal packet 8 which is mounted on the shaft 5, upon which a cage winding 9 is arranged. The rotor 3 is respectively delimited on the front side by a short-circuit ring 10, wherein in the illustrated embodiment are arranged two short-circuit rings 10, which are deployed on the opposite sides of the rotor 3.

In order to make it possible to effectively remove heat from the rotor 3, at least one thermosiphon device 11 is provided, while two thermosiphon device 11 are provided in the illustrated embodiment. However, it can be also provided that the thermosiphon devices 11, or at least one of the thermosiphone devices 11 is formed integrally with the short-circuit ring 10, or one of the short-circuits 10. The thermosiphon devices 11 are arranged on the opposite sides of the rotor 3 so that they are respectively connected in a rotationally fixed manner to the rotor 3 or to the shaft 5. Each of the thermosiphon device 11 is arranged on the front side on the rotor 3, in particular on the short-circuit ring 10. Only one of the thermosiphon devices will be further described below. However, the embodiments are always analogous with respect to the other thermosiphon device 11 or to both thermosiphon devices 11.

In order to enable an effective removal of the heat between the rotor 3 and the shaft 5, a heat transport element 12 is provided, which fully overlaps the rotor 3 in the axial direction and projects beyond the rotor 3 on both sides. In this case, the heat transport element 12 is engaged with its opposite ends in the axial direction in one of the thermosiphon devices 11. This means that the rotor 3 and the thermosiphon devices 11 are thermally coupled by means of the heat transport element.

Figure 2:
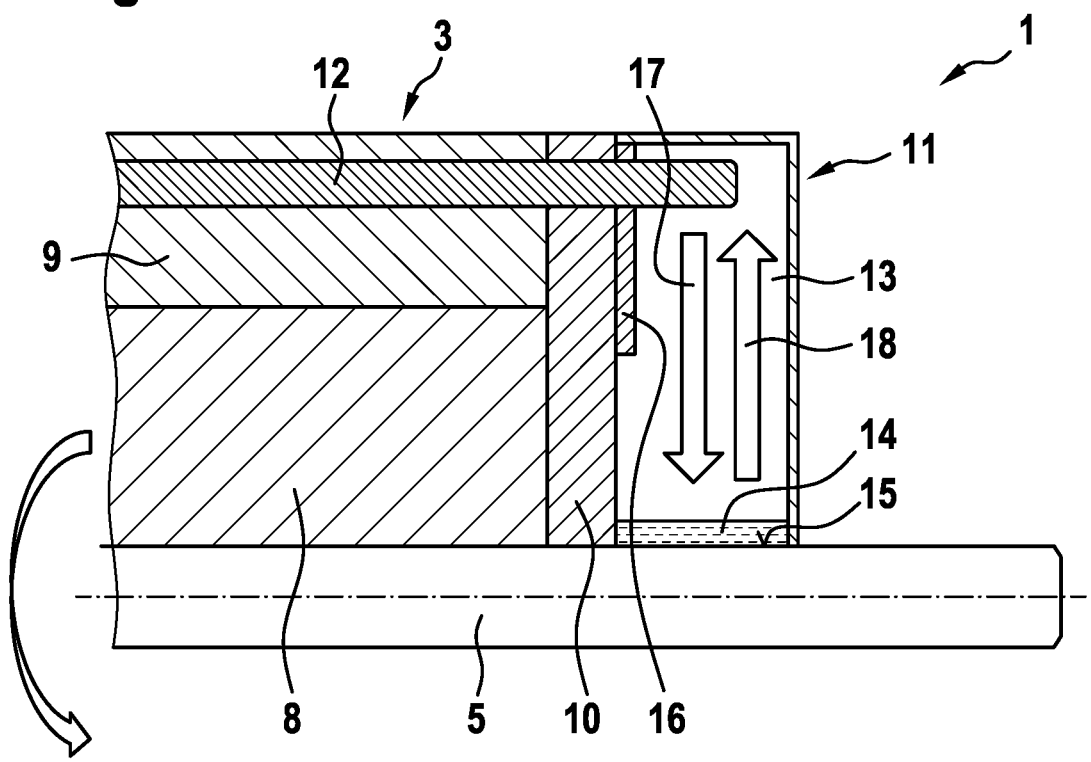
FIG. 2 shows a detailed longitudinal sectional view of the electric machine, wherein a thermosiphon device is illustrated enlarged.

FIG. 2 shows a detailed sectional view illustration of the electric machine 1 in the region of the thermosiphon device 11. It is evident that the thermosiphon device 11 is provided with a fluid chamber 13 in which is stored a coolant 14, which is only indicated here. The fluid chamber 13 is delimited both by the short-circuit ring 10 and by the shaft 5, or by an outer circumference 15 of the shaft 5, at least in some sections. This means that the coolant 14 is in direct contact or can be interconnected both with the short-circuit ring 10 and with the shaft 5.

It is again evident that the heat transport element 12 projects in the axial direction over the rotor 3 and thereby engages the short-circuit ring 10. The heat transport element 12 projects into the fluid chamber 13. It projects into the chamber in the axial direction, preferably only partially. On the short-circuit ring 10 are arranged or attached surface increasing elements 16, which project into the fluid chamber 13. The surface increasing elements 16 are used to increase the effective surface of the region of the short-circuit ring 10 which is in contact with the coolant.

The rotor 3 heats up during the operation of the electric machine 1. The heat generated in the rotor 3 is transported at least partially by means of a heat transport element 12, which is preferably designed as a heat pipe, in axial direction to the thermosiphon device 11, in particular up to the fluid chamber 13. The heat can be also supplied by means of the short-circuit ring 10 to the thermosiphon device 11 or to the coolant. The coolant evaporates and reaches in the direction of the arrow 17 in the radial direction the inner interior part towards the shaft 5, which has a lower temperature than the rotor 3. In particular, the temperature of the shaft 5 is set in such a way that the evaporated coolant will condense on the shaft.

The condensed coolant is taken along in the circumferential direct by the shaft 5 and due to the influence of centrifugal force, it is thrown out in the radial direction. This is illustrated by the arrow 18. The coolant that has been thrown in the outward direction pushes the already evaporated coolant out again, so that it is pushed again in the direction of the arrow 17 inwards in the radial direction. In addition, the next condensed coolant absorbs again the heat and then condenses again, so that it reaches the inner part again in the radial direction.

With such an embodiment of the electric machine 1, a significantly greater amount of heat can be discharged from the electric machine 1, in particular from its rotor 3, in the direction of the shaft 5, than with conventional electric machines. In addition, a more homogeneous distribution of temperature is achieved within the electric machine 1.

The invention claimed is:

1. An electric machine comprising:
a stator and a rotor which is rotatably mounted with respect to the stator on a coolable shaft, wherein the rotor, is connected to the shaft on the front face with a thermosiphon device, which is non-rotatably connected to the rotor in a manner enabling to transmit heat,
wherein the thermosiphon device is arranged on a rotor sheet metal packet on a side of a short-circuit ring of the rotor or the thermosiphon device is formed integrated with the short-circuit ring,
wherein the thermosiphon device includes a first thermosiphon device and a second thermosiphon device, and the first and second thermosiphon devices are arranged on opposite sides of the rotor, and
wherein a first fluid chamber of the first thermosiphon device and a second fluid chamber of the second thermosiphon device are respectively delimited by the short-circuit ring, a wall of the thermosiphon device adjacent to the short-circuit ring and an outer circumference of the shaft.

2. The electric machine according to claim 1, wherein surface increasing elements are projecting from the short-circuit ring and from the wall into the first and second fluid chambers.

3. The electric machine according to claim 1, wherein the thermosiphon device extends radially inward from the shaft with respect to an axis of rotation of the shaft, and overlaps outwards in the radial direction the rotor at least partially.

4. The electric machine according to claim 1, wherein at least one heat transport element projects into the first and second fluid chambers respectively from the short-circuit ring.

5. The electric machine according to claim 4, wherein the heat transport element passes partially through the rotor in the direction facing away from the thermosiphon device.

6. The electric machine according to claim 4, wherein the heat transport element rests against the rotor sheet metal packet and a cage winding of the rotor.

7. The electric machine according to claim 4, wherein the heat transport element is formed as a heat tube.

* * * * *